United States Patent [19]
Gordaninejad et al.

[11] Patent Number: 6,019,201
[45] Date of Patent: Feb. 1, 2000

[54] MAGNETO-RHEOLOGICAL FLUID DAMPER

[75] Inventors: Faramarz Gordaninejad; Darrell G. Breese, both of Reno, Nev.

[73] Assignee: Board of Regents of the University and Community College System of Nevada, Reno, Nev.

[21] Appl. No.: 08/901,896

[22] Filed: Jul. 29, 1997

Related U.S. Application Data

[60] Provisional application No. 60/022,780, Jul. 30, 1996.

[51] Int. Cl.[7] .................................................. F16F 15/03
[52] U.S. Cl. ............................ 188/267.1; 267/140.14; 188/322.15
[58] Field of Search ................................ 188/267, 267.1, 188/267.2, 322.15, 269; 267/140.14

[56] References Cited

U.S. PATENT DOCUMENTS

| | | | |
|---|---|---|---|
| 2,557,140 | 6/1951 | Razdowitz | 285/109 |
| 2,575,360 | 11/1951 | Rabinow | 192/21.5 |
| 2,635,483 | 4/1953 | Welsh | 74/574 |
| 2,661,596 | 12/1953 | Winslow | 60/52 |
| 2,661,825 | 12/1953 | Winslow | 192/21.5 |
| 2,663,809 | 12/1953 | Winslow | 310/78 |
| 2,667,237 | 1/1954 | Rabinow | 188/88 |
| 2,669,325 | 2/1954 | Raines | 188/1 |
| 2,692,582 | 10/1954 | Curci et al. | 121/38 |
| 2,733,792 | 2/1956 | Saxl | 192/21.5 |
| 2,846,028 | 8/1958 | Gunther | 188/88 |
| 2,940,749 | 6/1960 | Kemelhor | 269/1 |
| 2,973,969 | 3/1961 | Thall | 280/124 |
| 3,006,656 | 10/1961 | Schaub | 280/112 |
| 3,059,915 | 10/1962 | Kemelhor | 267/1 |
| 3,174,587 | 3/1965 | Walton | 188/87 |
| 3,321,210 | 5/1967 | Delchev | 280/6 |
| 3,538,469 | 11/1970 | Litte et al. | 335/219 |
| 3,543,901 | 12/1970 | Lengsfeld et al. | 192/107 |
| 3,550,048 | 12/1970 | Stallman | 355/193 |
| 3,941,402 | 3/1976 | Yankowski et al. | 280/124 R |
| 4,122,922 | 10/1978 | Baermann | 188/267 |
| 4,200,003 | 4/1980 | Miller | 74/574 |
| 4,351,515 | 9/1982 | Yoshida | 267/8 R |
| 4,401,298 | 8/1983 | Eaton et al. | 267/140.1 |
| 4,416,445 | 11/1983 | Coad | 267/35 |
| 4,517,505 | 5/1985 | Cunningham | 318/611 |
| 4,544,048 | 10/1985 | Hoffman | 188/251 A |
| 4,583,723 | 4/1986 | Ozawa | 267/140.1 |
| 4,673,067 | 6/1987 | Münning et al. | 188/299 |
| 4,679,775 | 7/1987 | Funaki et al. | 267/64.27 |
| 4,699,348 | 10/1987 | Freudenberg | 248/550 |
| 4,709,779 | 12/1987 | Takehara | 180/300 |
| 4,741,519 | 5/1988 | Dubos et al. | 267/140.1 |
| 4,753,421 | 6/1988 | Makibayashi et al. | 267/140.1 |
| 4,789,142 | 12/1988 | Hoying et al. | 267/140.1 |
| 4,819,772 | 4/1989 | Rubel | 188/299 |
| 4,844,220 | 7/1989 | Maji et al. | 188/267 |
| 4,869,476 | 9/1989 | Shtarkman | 267/140.1 |
| 4,872,652 | 10/1989 | Rohner et al. | 267/140.1 |
| 4,880,216 | 11/1989 | Härtel et al. | 267/140.1 |
| 4,896,587 | 1/1990 | Mintgen | 92/165 R |
| 4,896,752 | 1/1990 | Shtarkman | 188/299 |
| 4,899,996 | 2/1990 | Maassen et al. | 267/140.1 |
| 4,921,272 | 5/1990 | Ivers | 280/707 |
| 4,942,947 | 7/1990 | Shtarkman | 188/267 |
| 4,973,031 | 11/1990 | Takano et al. | 267/140.1 |
| 4,981,286 | 1/1991 | Kato et al. | 267/140.1 |
| 4,992,190 | 2/1991 | Shtarkman | 252/62.52 |
| 5,018,606 | 5/1991 | Carlson | 188/267 |
| 5,029,677 | 7/1991 | Mitsui | 188/267 |
| 5,052,662 | 10/1991 | Doi | 267/140.1 |
| 5,080,392 | 1/1992 | Bazergui | 280/707 |
| 5,176,368 | 1/1993 | Shtarkman | 267/140.14 |
| 5,265,703 | 11/1993 | Ackermann | 188/299 |
| 5,277,281 | 1/1994 | Carlson et al. | 188/267 |
| 5,283,234 | 2/1994 | Wang et al. | 505/1 |
| 5,284,330 | 2/1994 | Carlson et al. | 267/140.14 |
| 5,285,878 | 2/1994 | Scheffel et al. | 188/319 |
| 5,293,969 | 3/1994 | Yamaoka et al. | 188/299 |
| 5,301,776 | 4/1994 | Beck | 188/322.13 |
| 5,303,803 | 4/1994 | Grün et al. | 188/299 |
| 5,303,804 | 4/1994 | Spiess | 188/319 |
| 5,318,157 | 6/1994 | Kempf | 188/299 |
| 5,353,839 | 10/1994 | Kordonsky et al. | 137/806 |
| 5,375,683 | 12/1994 | Huang et al. | 188/299 |
| 5,382,373 | 1/1995 | Carlson et al. | 252/62.55 |
| 5,389,905 | 2/1995 | Shibata et al. | 335/78 |
| 5,392,883 | 2/1995 | Huang et al. | 188/282 |
| 5,398,917 | 3/1995 | Carlson et al. | 267/140.14 |
| 5,409,088 | 4/1995 | Sönsteröd | 188/299 |
| 5,413,196 | 5/1995 | Förster | 188/299 |

| | | |
|---|---|---|
| 5,435,421 | 7/1995 | Beck ........................................ 188/299 |
| 5,445,249 | 8/1995 | Aida et al. .............................. 188/378 |
| 5,454,452 | 10/1995 | Öhlin ..................................... 188/299 |
| 5,462,142 | 10/1995 | Handke et al. ......................... 188/299 |
| 5,492,312 | 2/1996 | Carlson ............................. 267/140.14 |
| 5,505,880 | 4/1996 | Kormann et al. ..................... 252/62.54 |
| 5,509,888 | 4/1996 | Miller ........................................ 600/29 |
| 5,624,010 | 4/1997 | Huang et al. ........................... 188/299 |
| 5,878,851 | 3/1999 | Carlson et al. ......................... 188/269 |

FOREIGN PATENT DOCUMENTS

| | | |
|---|---|---|
| 0 297 608 A1 | 1/1989 | European Pat. Off. . |
| 1094516 | 5/1955 | France . |
| 1 084 528 | 6/1960 | Germany . |
| 3631107 A1 | 3/1988 | Germany . |
| 3800678 A1 | 7/1989 | Germany . |
| 58-113644 | 7/1983 | Japan . |
| 58-221034 | 12/1983 | Japan . |
| 63-001833 | 1/1988 | Japan . |
| 63-180742 | 7/1988 | Japan . |
| 63-210432 | 9/1988 | Japan . |
| 63-231031 | 9/1988 | Japan . |
| 5-162524 | 6/1993 | Japan . |
| 1248875 A1 | 8/1986 | U.S.S.R. . |
| 1249229 | 8/1986 | U.S.S.R. . |
| 756107 | 8/1956 | United Kingdom . |
| 1 282 568 | 7/1972 | United Kingdom . |
| 2 186 947 | 8/1987 | United Kingdom . |

*Primary Examiner*—Robert J. Oberleitner
*Assistant Examiner*—Melanie Talavera
*Attorney, Agent, or Firm*—Morgan, Lewis & Bockius LLP

[57] ABSTRACT

A controllable magneto-rheological damper includes a housing; a piston movably disposed in the housing; a cavity defined by the housing and the piston; a passage fluidically coupled to the cavity; a magneto-rheological fluid contained within the cavity, wherein motion of the piston is damped by flow of the magneto-rheological fluid through the passage; and a magnet disposed to produce a magnetic field within the passage with field lines essentially parallel to the passage.

32 Claims, 20 Drawing Sheets

MAGNETO-RHEOLOGICAL FLUID DAMPER

This application claims the benefit of U.S. Provisional Application No. 60/022,780 filed on Jul. 30, 1996, which is hereby incorporated by reference.

BACKGROUND OF THE INVENTION

1. Field of the Invention

The present invention relates to a damper, and more particularly to a magneto-rheological fluid damper.

2. Discussion of the Related Art

During the past decade there has been increasing interest in the development of controllable dampers that utilize electro-rheological fluid (ERF) and magneto-rheological fluids (MRF). The possibility of using ERF or MRF based damping devices in various applications has made these controllable devices attractive to designers.

An MRF consists of micron-sized, magnetically polarized particles suspended in a carrier fluid, such as silicon or mineral oils. MRFs are capable of responding to a magnetic field in a few milliseconds. The material properties of an MRF can be changed rapidly by increasing or decreasing the intensity of the applied magnetic field.

Examples of conventional devices are disclosed, for example, in U.S. Pat. No. 3,174,587 to Walton and U.S. Pat. No. 5,277,281 to Carlson et al. Here, the magnetic field is generated by a magnetic circuit which requires a ferrous material for the flow path. Thus, if a ferrous material is not used for the magnetic circuit of an MRF damper, the damper is not operational.

Referring to FIGS. 1 and 2, a conventional MRF damper has an I-shaped magnetic circuit A formed of a ferrous material. Windings of electric wires B produce a magnetic flux C in the magnetic circuit. However, a small gap D is formed in the magnetic circuit A through which the MRF flows according to the displacement of the piston E. In this manner, the magnetic flux C is directed through the MRF to the cylindrical housing F to complete the magnetic circuit path. In the presence of a magnetic field, the ferrous particles in MRP form chains H perpendicular to fluid flow through the passage. Accordingly, increased damping results from the particle chain's resistance to shearing.

However, conventional MRF damper designs have significant limitations. For example, the magnetic path must be formed of ferrous materials. As illustrated in FIGS. 1 and 2, the piston consists of an I-shape magnetic circuit. The magnetic flux lines, that are formed only inside the ferrous magnetic circuit, activate the MRF at the gaps, thereby creating a chain-like formation of MRF particles across the gap to resist the motion of the piston.

Further, the MRF passages must be very small in order to generate a sizable damping force. As shown in FIG. 2, if the dimension of the gap through which the MRF flows is too E large, the chain-like formation of the particles will produce smaller resistance forces. Thus, less resistance to the motion of the piston is obtaining, thereby resulting in smaller damping forces. In contrast, if the gap size is too small, it is difficult to achieve the necessary tolerance in manufacturing the individual components.

SUMMARY OF THE INVENTION

Accordingly, the present invention is directed to a magneto-rheological fluid damper that substantially obviates one or more of the problems due to limitations and disadvantages of the related art.

An object of the present invention is to provide an MRF damper which can be formed of non-ferrous materials.

Another object of the present invention is to provide an MRF damper with a larger flow passage cross sectional area.

Another object of the present invention is to provide an MRF damper which is easily and economically manufactured.

Another object of the present invention is to provide an MRF damper with reduced weight.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the damper comprises a housing; a movable wall; a cavity defined by the housing and the movable wall; a passage fluidically coupled to the cavity; a magneto-rheological fluid contained within the cavity, wherein motion of the movable wall is damped by flow of the magneto-rheological fluid through the passage; and a magnet disposed to produce a magnetic field within the passage with field lines essentially parallel to the passage.

In another aspect, the damper comprises a housing; a movable wall; a cavity defined by the housing and the movable wall; a passage fluidically coupled to the cavity; a magneto-rheological fluid contained within the cavity; and a magnet disposed to produce a magnetic field within the passage, wherein motion of the movable wall is damped by flow of the magneto-rheological fluid through the passage, an amount of damping varying according to a magnitude of the magnetic field.

In another aspect, the damper comprises a housing formed of a non-magnetic material; a movable wall formed of a non-magnetic material; a cavity defined by the housing and the movable wall; a passage fluidically coupled to the cavity; a magneto-rheological fluid contained within the cavity, wherein motion of the movable wall is damped by flow of the magneto-rheological fluid through the passage; and a magnet disposed to produce a magnetic field within the passage.

In another aspect, the damper comprises a housing; a piston slidably disposed in the housing, the piston dividing an interior of the housing into first and second cavities; a passage defined in the piston fluidically coupling the first and second cavities; a magneto-rheological fluid contained within the first cavity, wherein motion of the piston is damped by flow of the magneto-rheological fluid through the passage; and a magnet disposed to produce a magnetic field within the passage with field lines essentially parallel to the passage.

In another aspect, the damper comprises a housing defining a first cavity, a second cavity, and a passage fluidically coupling the first and second cavities; a piston slidably disposed in the first cavity; a magneto-rheological fluid contained within the first cavity, wherein motion of the piston is damped by flow of the magneto-rheological fluid through the passage; a plate disposed proximate an opening of the passage for turning the magneto-rheological fluid; and a magnet disposed to produce a magnetic field within the passage with field lines essentially parallel to the passage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The MRF damper according to the present invention comprises at least one cavity unit for containing an MRF, and at least one piston movably disposed in the cavity unit for displacing the MRF through a passage defined in the cavity unit. The cavity unit and the piston may be formed of a non-ferrous material, a ferrous material, or a combination of materials. Generally, the piston is cylindrical in shape. The present invention further comprises at least one magnet member, such as a solenoid or a permanent magnet, for generating a magnetic field around the piston and/or the housing. If a solenoid is employed, the solenoid may be formed by a number of windings of magnetic wire. The MRF flow passage may be straight or curved and is preferably located through the center of the magnet member. However, the flow passage may be located at any off-center location as long as the passage traverses through the magnet member.

The MRF flows axially through the passage disposed in the center of the magnet member within the piston or the housing. In this manner, the intensity of the magnetic flux is maximum at the entries of the passage. The ferrous particles in the MRF form chains parallel to the flow through the passage. The presence of particle chains reduces the effective diameter of the flow passage, resulting in a greater damping force. If a solenoid is used as the magnet member, a variable magnetic field is generated in the passage through which the MRF flows. Thus, the configuration can cause partial or total restriction of the flow of MRF through the passage according to the magnitude of magnetic field, thereby variably controlling the damping force of the damper.

In specific applications, a plurality of passages may be used to achieve desired damping characteristics. Also, seals may be provided at the caps of the cavities using O-rings or other types of seals to prevent leakage or contamination. Further, a spring or spring-like material may be employed in combination to construct a spring-dashpot damping device.

The structure of an MRF damper according to a first embodiment of the present invention will now be described.

Figure 1:
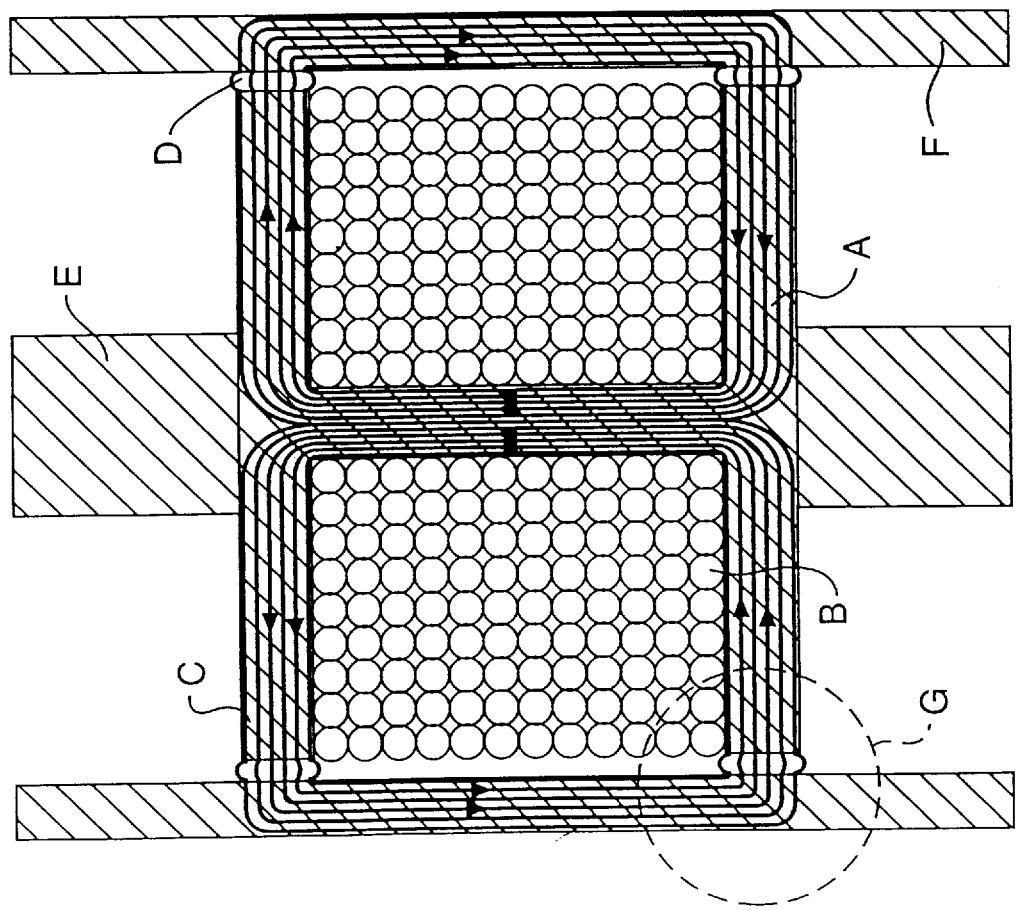
FIG. 1 is a cross-sectional view of a conventional MRF damper.
Figure 2:
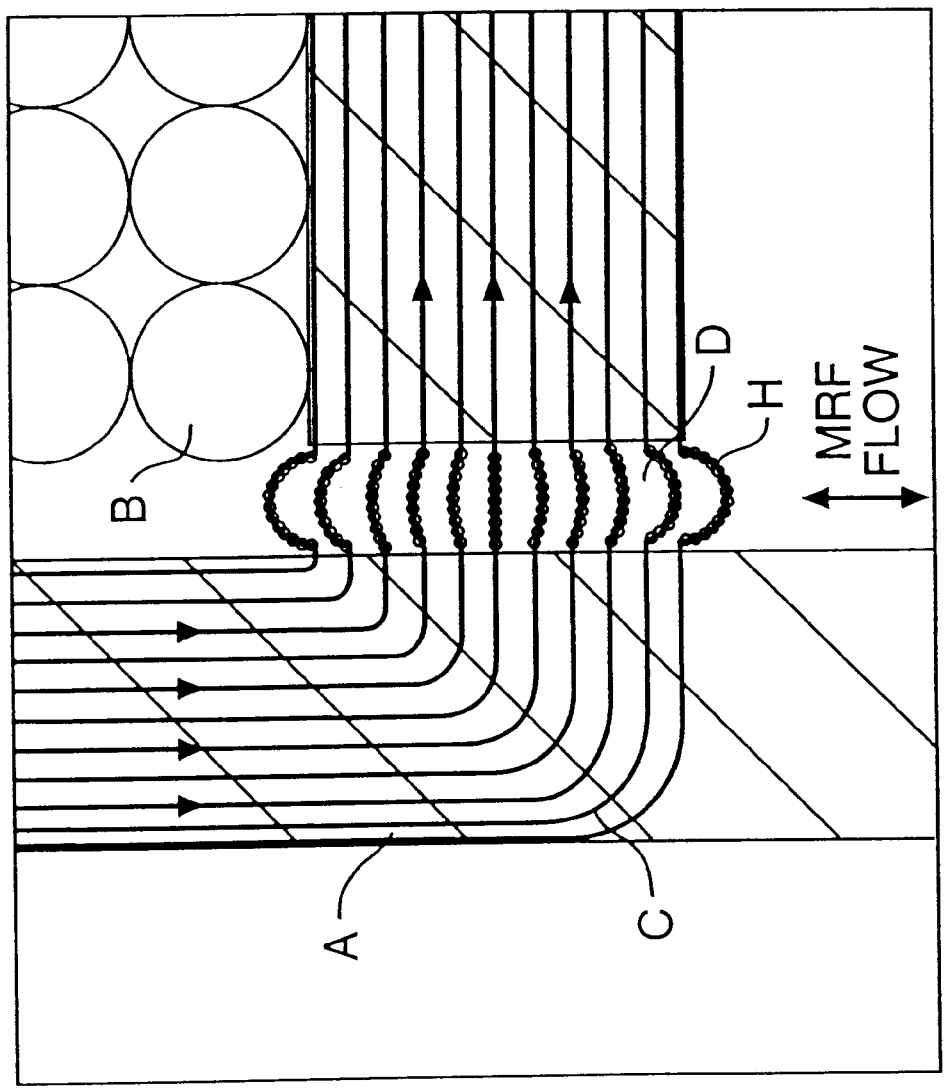
FIG. 2 is an enlarged view of portion G of FIG. 1.
Figure 3A:
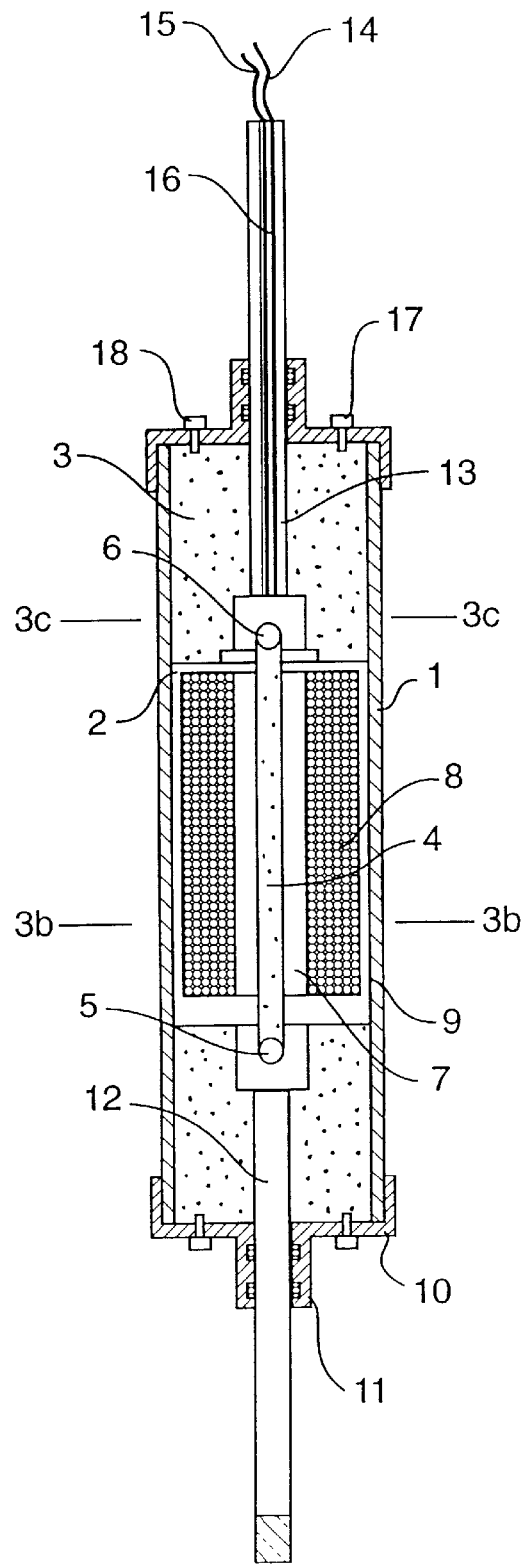
FIG. 3a is a cross-sectional view of an MRF damper according to a first embodiment of the present invention.

As shown in FIG. 3a, the outer housing 1 generally includes a cylinder with end caps 10. Each end cap 10 contains a seal 11 for retaining the contents of the device. The first of the seals 11 serves as a scraper and the second serves to further prevent fluid from leaking out of the device. One of the end caps 10 contains two access ports 17 and 18 which can be used for removing all air pockets from the device when it is initially filled with MRF. Rods 12 and 16 protrude through each end cap 10. Either or both of these rods can be attached to the equipment to be damped, for example, by threading the ends or by any other attachment means. With the two rods 12 and 16, the need for an additional reservoir to compensate for changes in the volume is avoided. Additionally, one of the rods 16 must contain a passage in the center which allows power to be supplied to the device.

The housing contains an appropriate amount of MRF 3. A moveable piston separates the two internal cavities of the device. The piston contains a core 7 with a passage 4 within its center. The passage 4 is open at both ends 5 and 6 to pass the MRF from one side of the piston to the other through the passage 4. Around core 7 is a magnet member which may be formed by the windings of a solenoid 8. This solenoid is powered through wires 14 and 15. The windings of solenoid 8 create a magnetic field which changes the physical characteristics of the MRF passing through passage 4. As the MRF is subjected to the magnetic field, the viscosity increases and the flow is restricted. In order to ensure the integrity and longevity of the solenoid, a cover 2 is used to encapsulate the windings 8. Additionally, cover 2 serves the purpose of ensuring that the fluid passes exclusively through passage 4. This is done by specifying a very small gap 9 to prevent the flow of MRF.

Figure 3B:
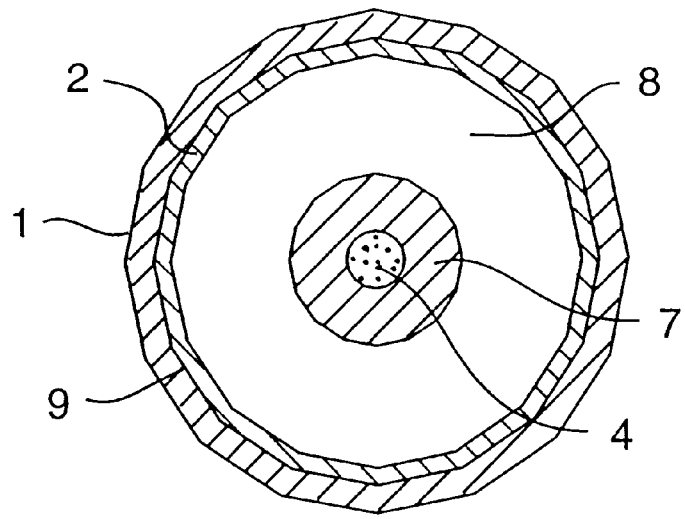
FIG. 3b is a cross-sectional view of the MRF damper of FIG. 3a along line 3b—3b.

FIG. 3b shows a cross sectional view of the piston assembly along line 3a—3a of FIG. 3a. Passage 4 is located at the center of FIG. 3b. The core of the piston 7, the windings of the solenoid 8, and the cover 2 of the windings are disposed around the passage. The outer housing 1 encloses the components. Again, the gap 9 between the cover 2 and the housing 1 is kept small. Seals may be employed to prevent MRF from entry into the gap 9.

Figure 3C:
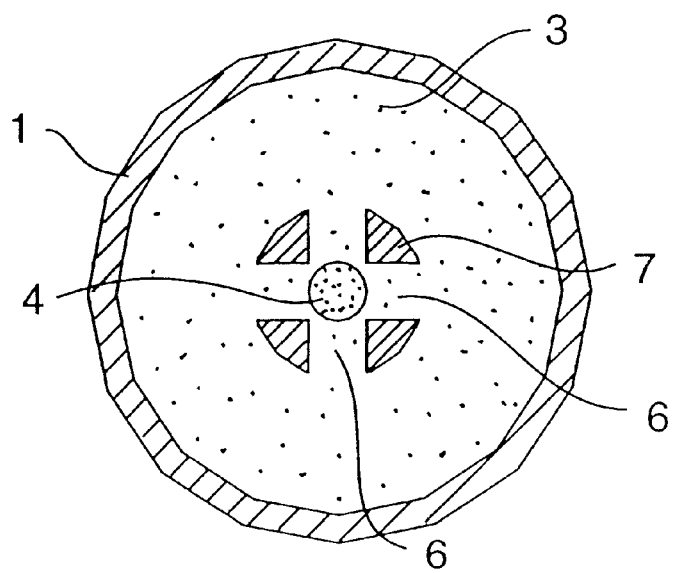
FIG. 3c is a cross-sectional view of the MRF damper of FIG. I across line 3c—3c.

FIG. 3c shows a cross sectional view of the piston assembly along line 3c—3c in FIG. 3a. Passage 4 is located at the center of FIG. 3c. The core sections of the piston are shown as 7. Passages 6 are the means by which MRF 3 enters/exits passage 4. Although four passages are shown, any number of passages may be employed according to the specific application.

Figure 4:
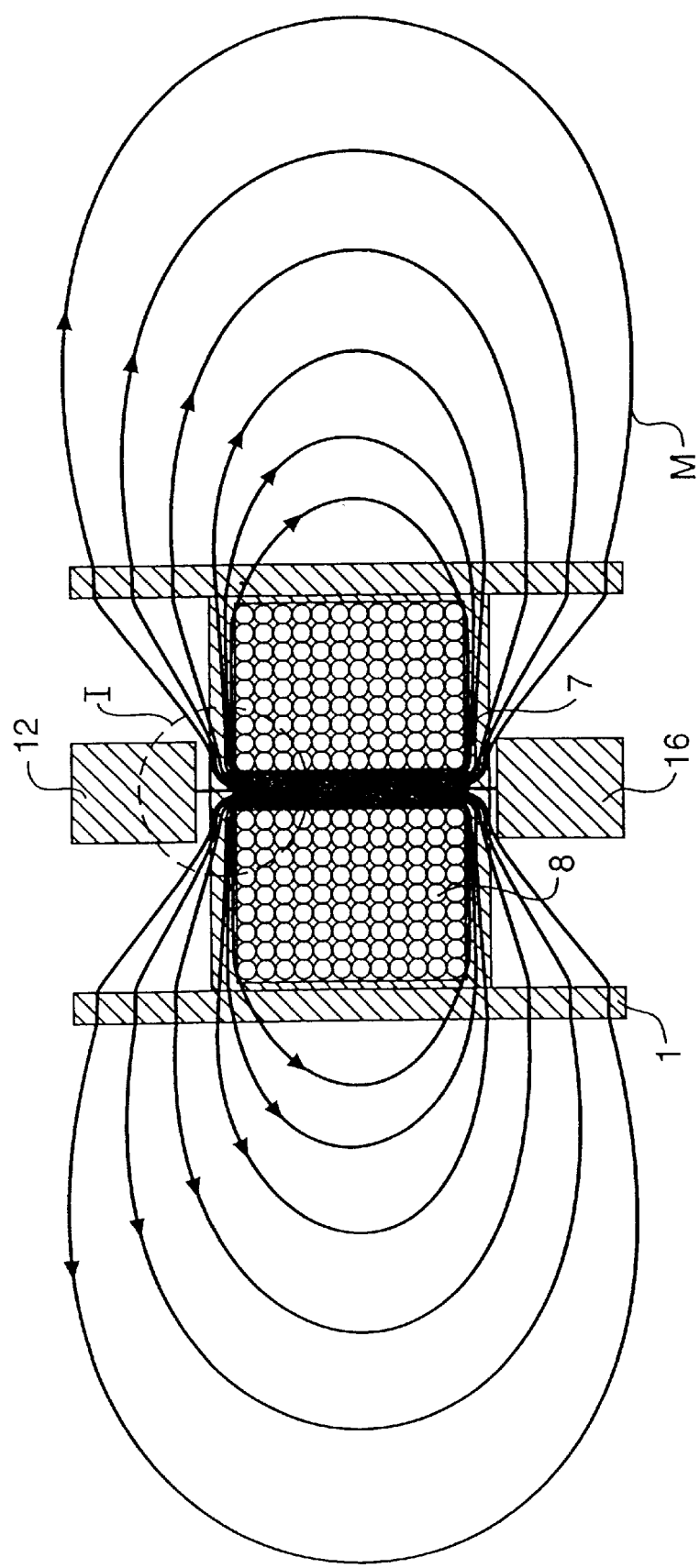
FIG. 4 is a cross-sectional view of the MRF damper of FIG. 1 showing the magnetic field lines.
Figure 5:
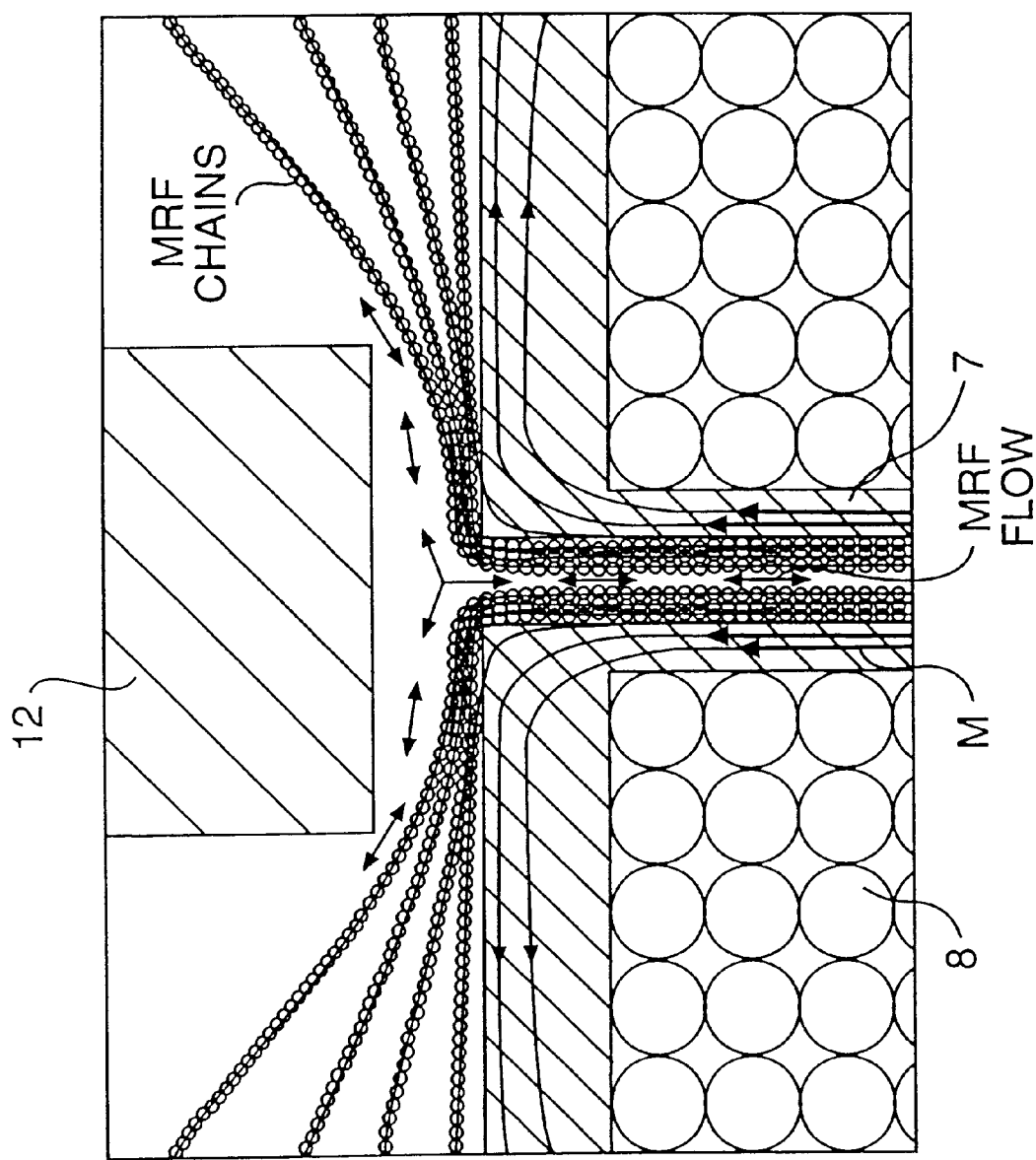
FIG. 5 is an enlarged view of the portion I of FIG. 4.

FIG. 4 shows the magnetic fields of the MRF damper of the present invention and FIG. 5 shows an enlarged view of the circled portion of FIG. 4. Here, a magnetic flux M is produced in the direction of the flux lines, essentially parallel to the MRF flow in the passage. As shown in FIG. 5, the core fluid port diameter is reduced when the MRF particle chains build-up.

Figure 6A:
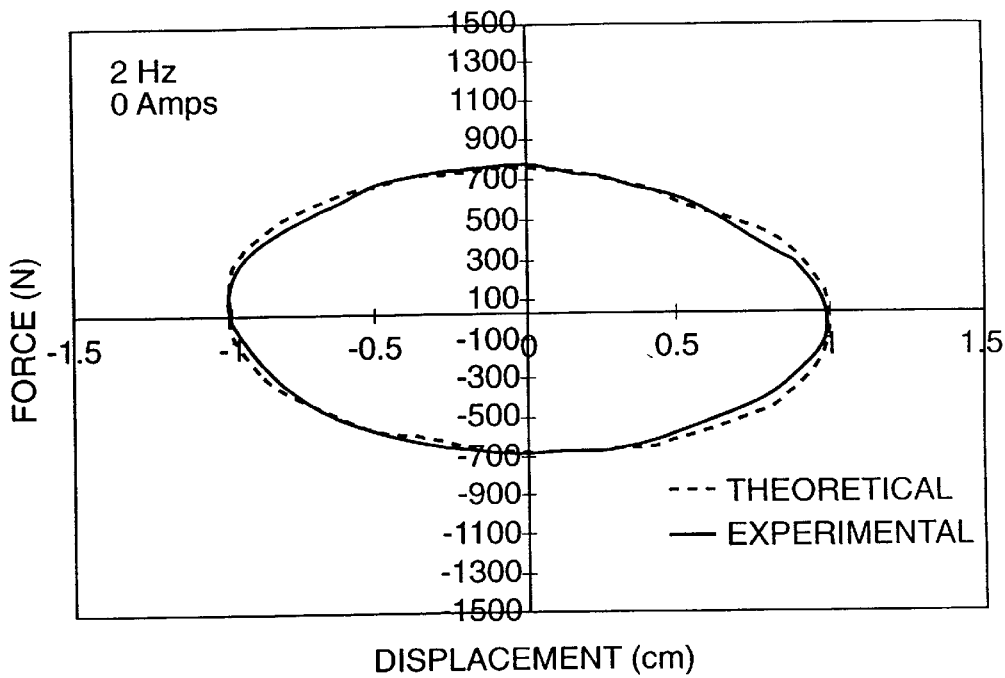
FIGS. 6a and 6b are experimental and theoretical force-displacement and force-velocity plots for an MRF damper according to the first embodiment without activation.
Figure 6B:
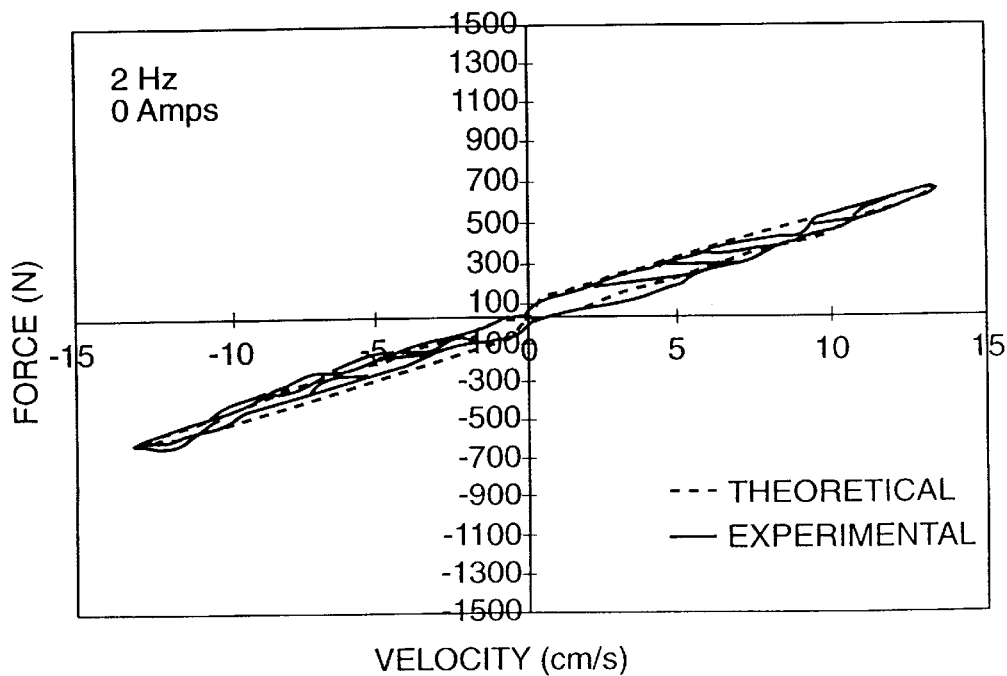
Figure 7A:
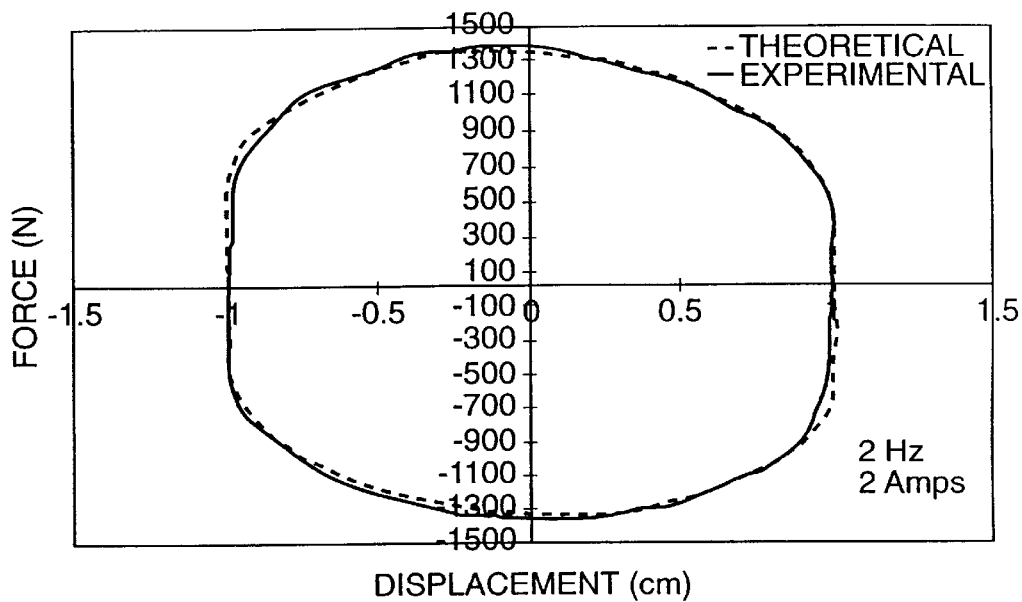
FIGS. 7a and 7b are experimental and theoretical force-displacement and force-velocity plots of an MRF damper according to the first embodiment after activation.
Figure 7B:
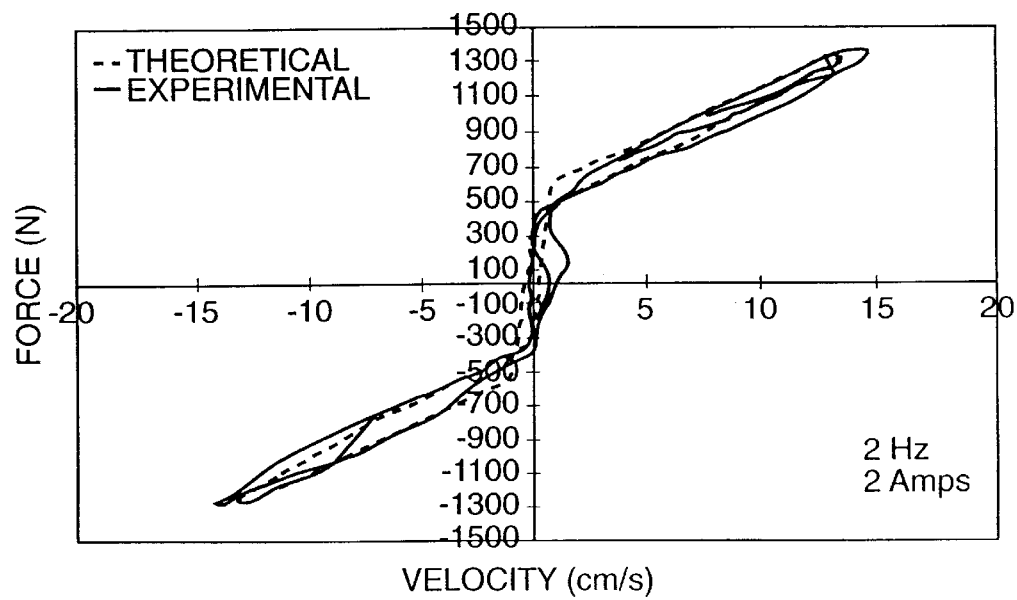

FIGS. 6a and 6b show a force-displacement plot and a force velocity plot for a 23 cm (9 in) long MRF damper with a 5 cm (2 in) diameter. A damping force of 728 N (162 lb) can be obtained for a vibration of 2 Hz and amplitude of 1 cm (0.4 in) when the damper is not activated (0 Amp input). Using the Bouc-Wen model, the experimental results were predicted as shown. FIGS. 7a and 7b show the results after the MRF damper is activated by 2 Amps and 10 volts of input. Here, the maximum force produced by the damper increases to 1400 N (315 lb) which corresponds to a 92% increase. The increase in the damping force for various input currents and various frequencies of sinusoidal motions are presented in FIG. 8. Here, the damping force increases with both the input current and the frequency of the motion.

Figure 9:
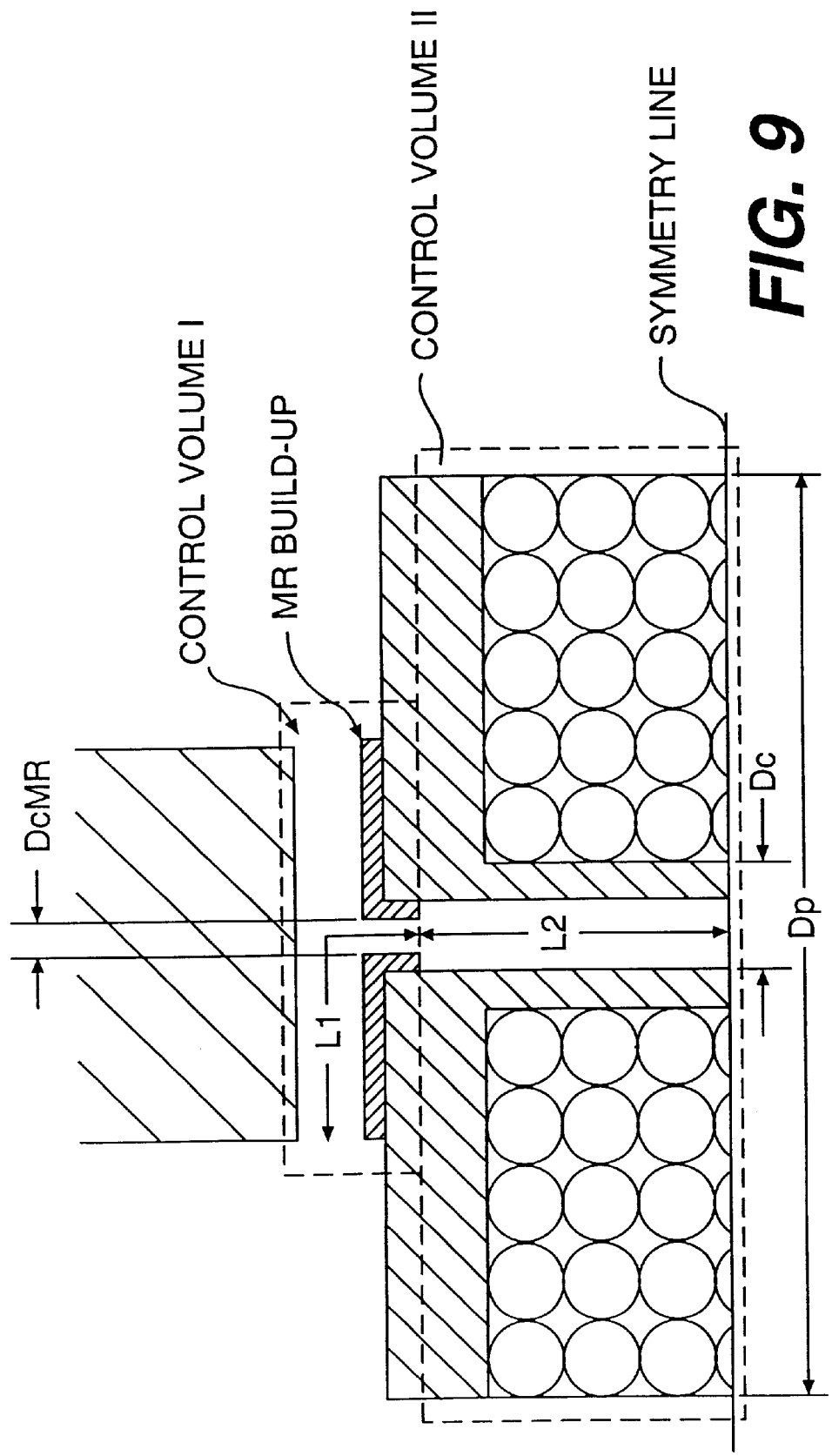
FIG. 9 is a detailed view of the MRF flow passages according to the present invention.

A theoretical model was developed based on the mechanics of MRF flow through the passages. In FIG. 9, the cross-section of the piston section is illustrated. The MRF build-up area is represented by the dark shaded area. Control volume I defines the region where there is a significant MRF build-up. As a result, ferrous particles in the MRF bond in a chain-like formation to effectively reduce the channel diameter from $D_c$ to $D_{c,MR}$. Using classical fluid mechanics for analysis of flow through a pipe and volume conservation, the force generated in control volume I is:

$$F_1 = 16\pi\mu L_1 V_p \overline{D}^2 + \frac{\pi}{16}(D_p^2 - D_{c,MR}^2)\rho V_p^2[\overline{D}^2(k-1) + 4(\overline{D}+1)^2] \quad (1)$$

where $$\overline{D} = \left(\frac{D_p}{D_{c,MR}}\right)^2 - 1 \quad (2)$$

Similarly, by using classical fluid mechanics for control volume II, the force is:

$$F_2 = 16\pi\mu L_2 V_p \overline{D}_p^2 (\overline{D}_p^2 - 1) \quad (3)$$

where $$\overline{D}_p = \frac{D_p}{D_c} \quad (4)$$

The total MRF damper force is, therefore, $$F = F_1 + F_2 \quad (5)$$

In equations (1) through (4), $D_p$ is the piston diameter, $D_c$ is the core fluid port diameter, $D_{c,MR}$ is the core fluid port diameter after MRF build-up, $L_1$ is the flow path length in control volume I, $L_2$ is the flow path length in control volume II, $V_p$ is the piston velocity, $\mu$ is the MRF viscosity, $\rho$ is the MRF density, and k is the loss coefficient.

Again, an MRF damper as presented with reference to FIGS. 6a, 6b, 7a, and 7b is considered. The piston velocity is 13 cm/sec (5.1 in/sec), the lengths of the control volume I and II are 1.3 cm (0.5 in) and 5.1 cm (2.0 in), respectively, the loss factor is 0.16, and the MRF's viscosity and density are 0.22 kg/m-sec (0.01232 lb/in-sec), 3,225 kg/m³ (0.1165 lb/in³), respectively. For the case where the input current is 0 Amp (i.e., $D_c = D_{c,MR}$) there is no MRF build-up and the total MRF damping force calculated from equation (5) is 720 N (162.6 lb). The experimental results FIG. 6a show a 728 N (163.9 lb) force.

Figure 8:
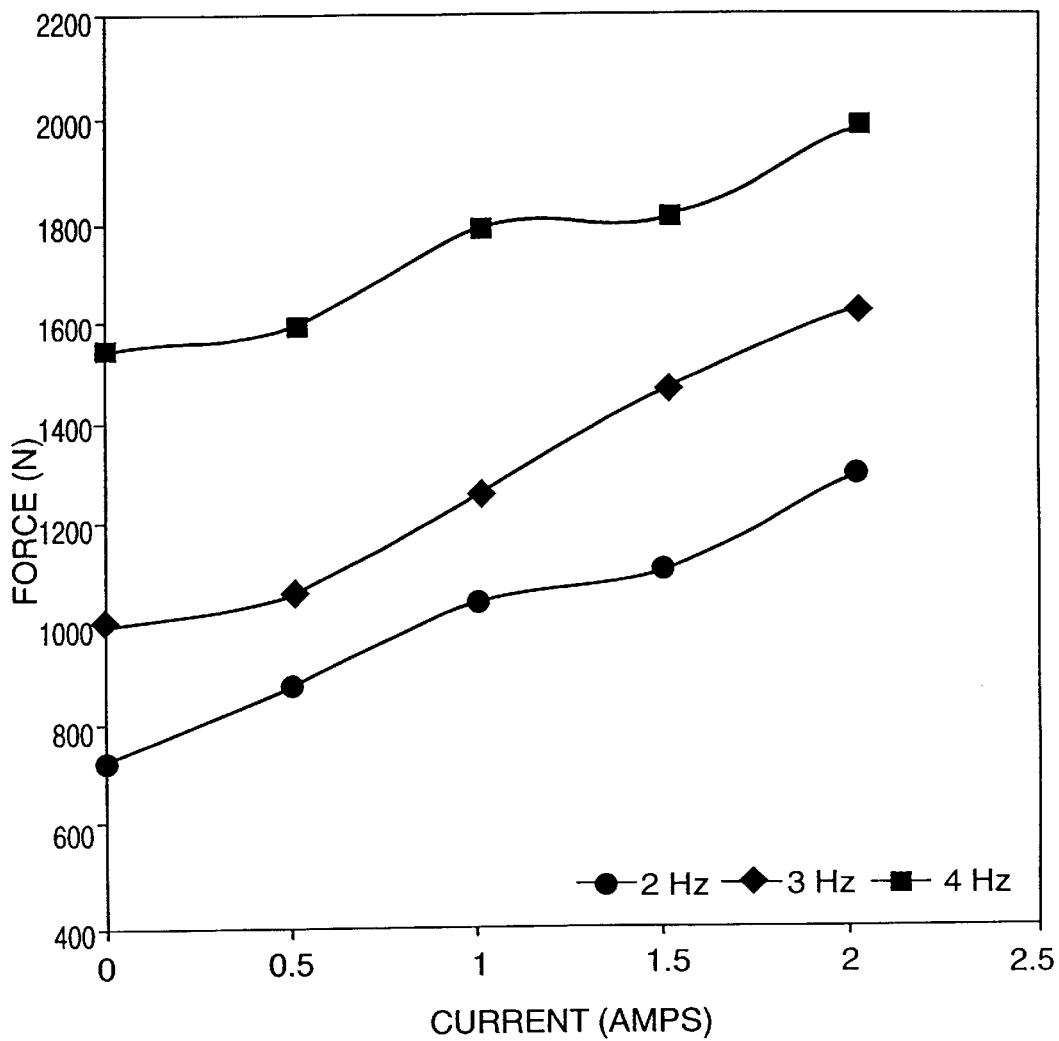
FIG. 8 is a force-current plot for an MRF damper according to the first embodiment.
Figure 10A:
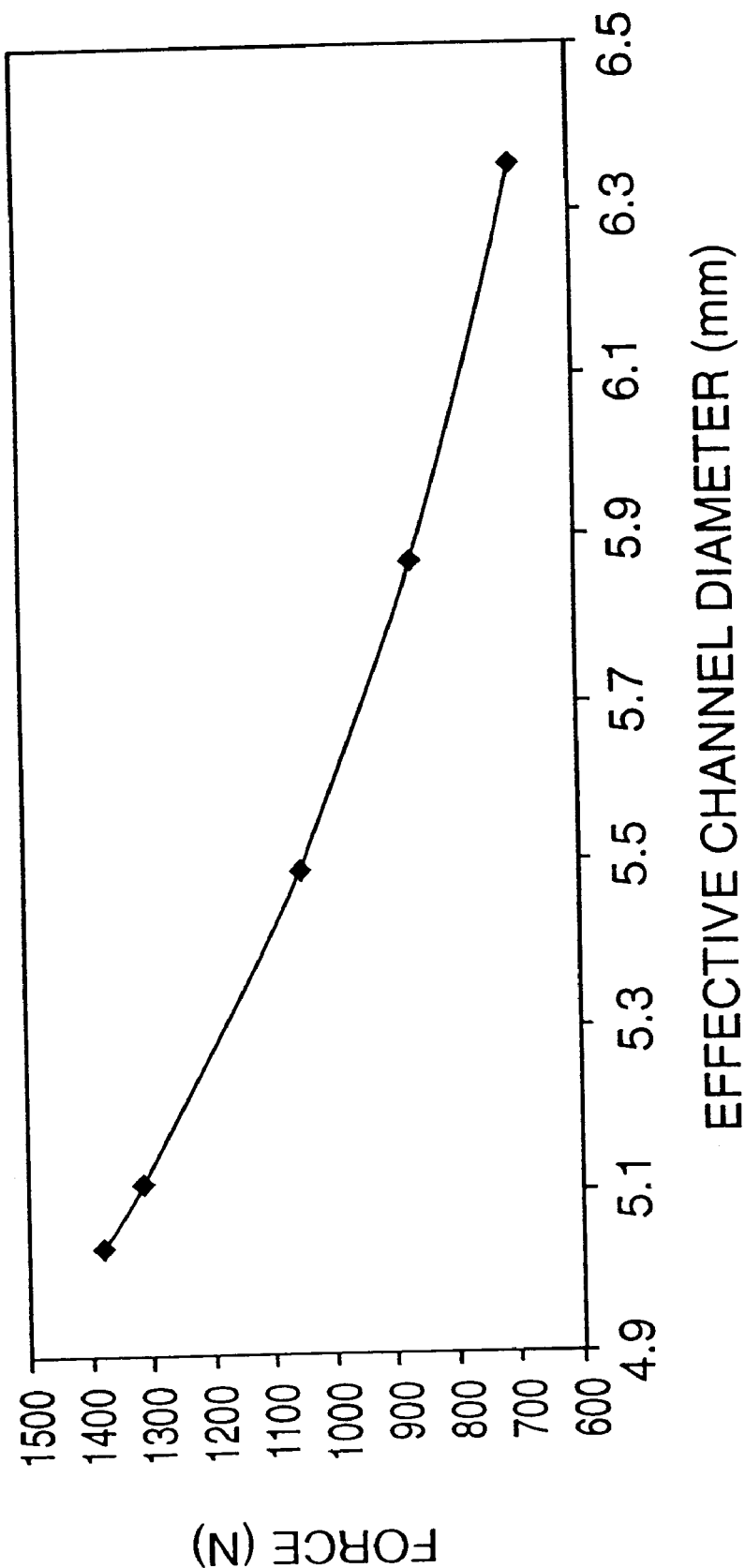
FIGS. 10a and 10b are plots showing the theoretical characteristics of an MRF damper according to the first embodiment.
Figure 10B:
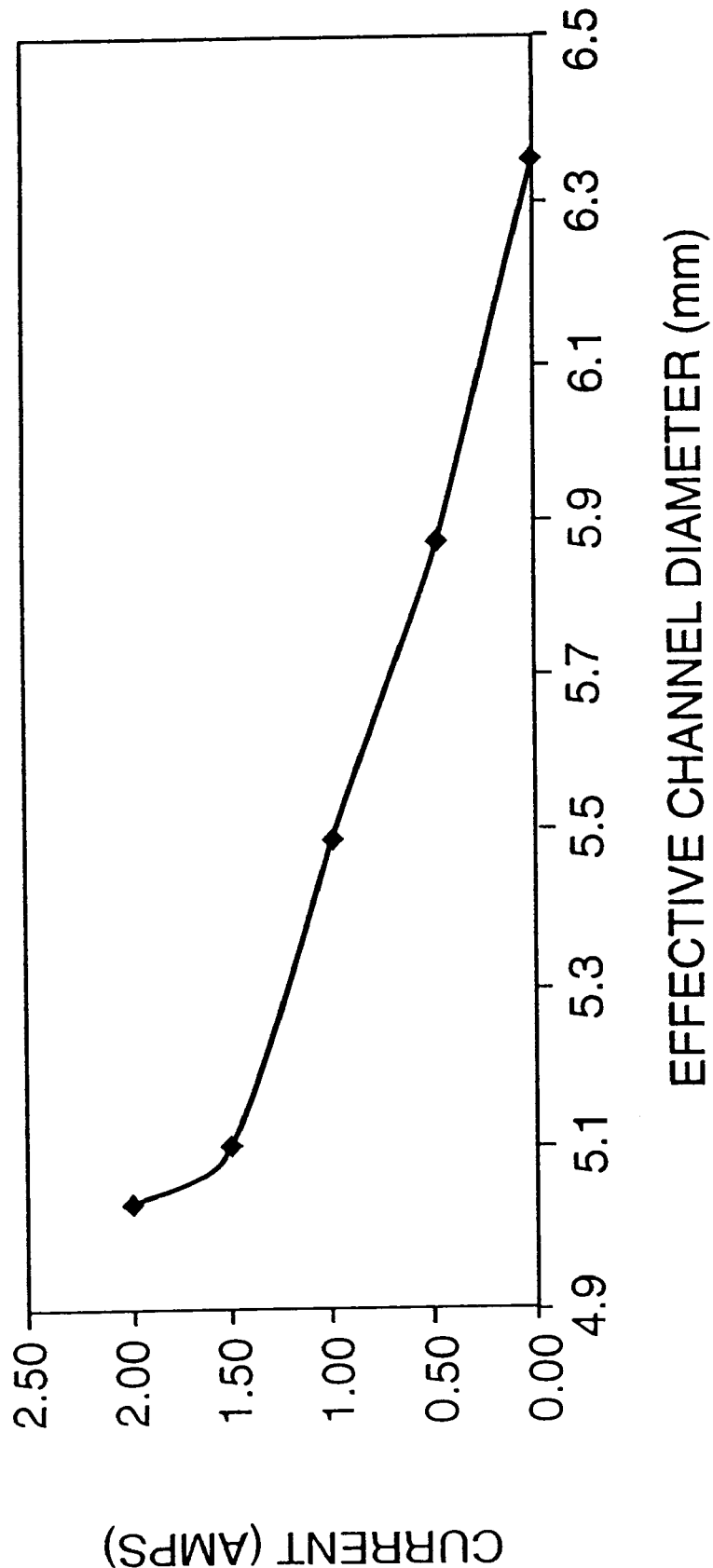

The experimental results presented in FIG. 8 for a sinusoidal input motion of 2 Hz and 1 cm (0.39 in) amplitude, in conjunction with equation (5) were used to determine the effective channel diameter, $D_{c,MR}$, presented in FIGS. 10a and 10b. As can be seen, the effective channel diameter decreases significantly by increasing the input current, resulting in an increased force.

The structure of an MRF damper according to a second embodiment will now be described. The second embodiment is similar to the first embodiment but particularly adapted to a mountain bicycle.

Figure 11A:
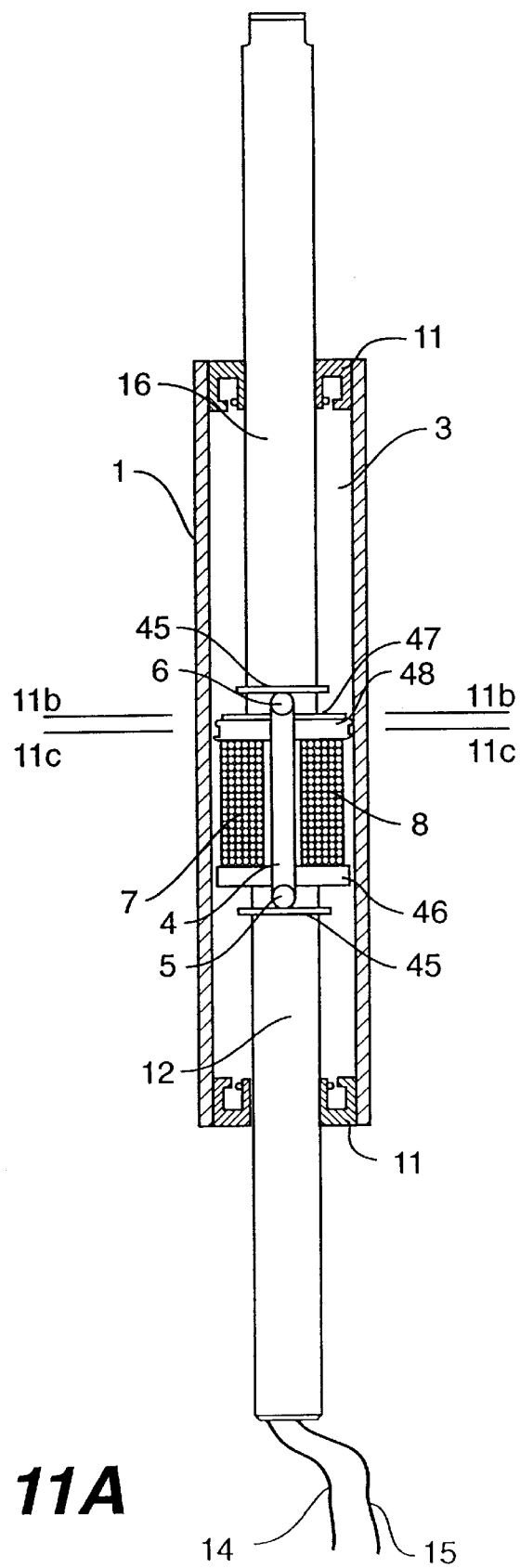
FIG. 11a is a cross-sectional view of an MRF damper according to a second embodiment of the present invention.
Figure 11B:
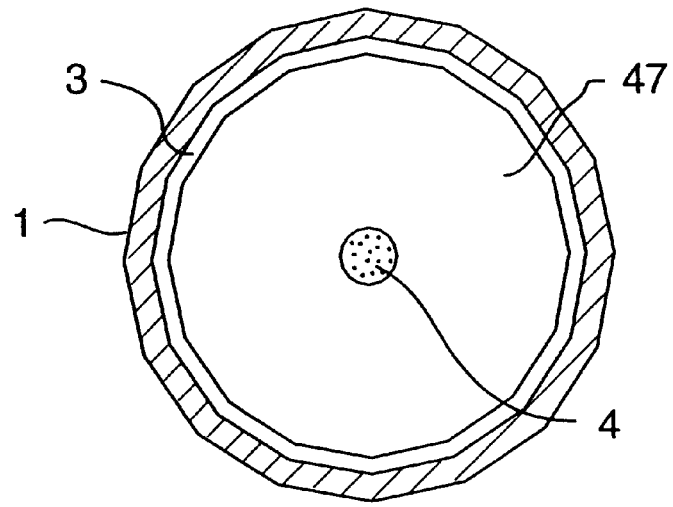
FIG. 11b is a cross-sectional view of the MRF damper of FIG. 11a across line 11b—11b.
Figure 11C:
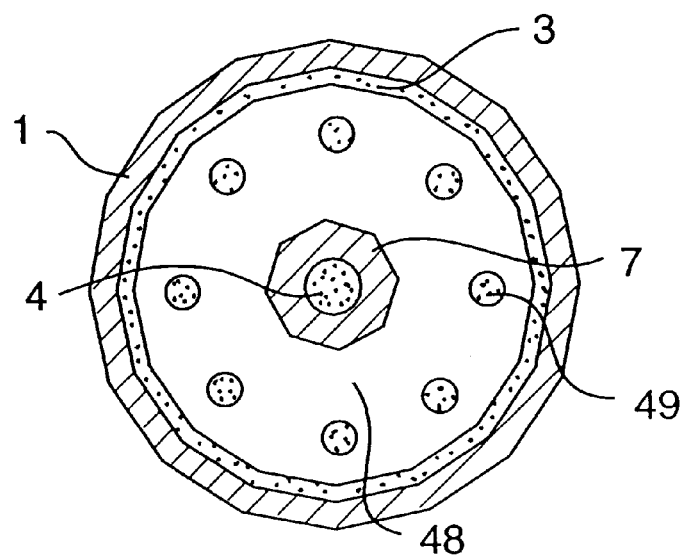
FIG. 11c is a cross-sectional view of the MRF damper of FIG. 11a across line 11c—11c.

Referring to FIGS. 11a through 11c, the differences in this design arise from the performance requirements of a typical mountain bicycle damper. The mountain bike damper design reflects performance characteristics similar to those found in current typical damper designs. Mountain bicycle dampers require different rebound and compression forces. This was achieved though the inclusion of a simple one-way valve. This has been accomplished by providing an additional washer 47 to provide different rebound and compression forces, as shown in FIGS. 11a and 11c. Also, the piston cap 48 contains additional passages 49 for MRF 3 to travel from one passage to the other as the piston travels within the damper, as shown in FIGS. 11a and 11c.

Referring to FIG. 11a, the compression stroke causes the piston to move upward relative to cylinder 1. This causes washer 47 to cover passages 49, thereby ensuring that the only path for the MRF 3 to travel through is through passage 4. As the piston moves in the opposite direction (the rebound stroke) washer 47 will displace upward, thereby allowing the MRF 3 to pass through passages 49 and passage 4. In order to ensure that MRF 3 can reach passages 49, the outer diameters of piston cap 46 and windings 8 are intentionally produced smaller than the inner diameter of cylinder 1. This will effectively reduce the rebound forces as compared to the compression forces of the mountain bicycle damper.

Figure 12A:
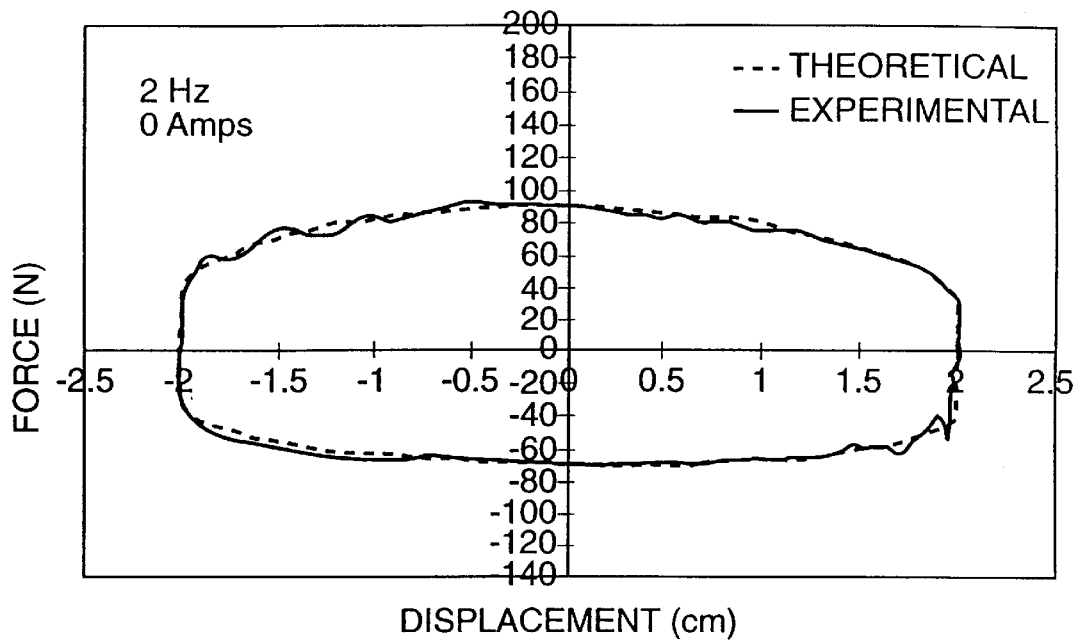
FIGS. 12a, 12b and 13 are experimental and theoretical plots of the characteristics of an MRF damper according to the second embodiment.
Figure 12B:
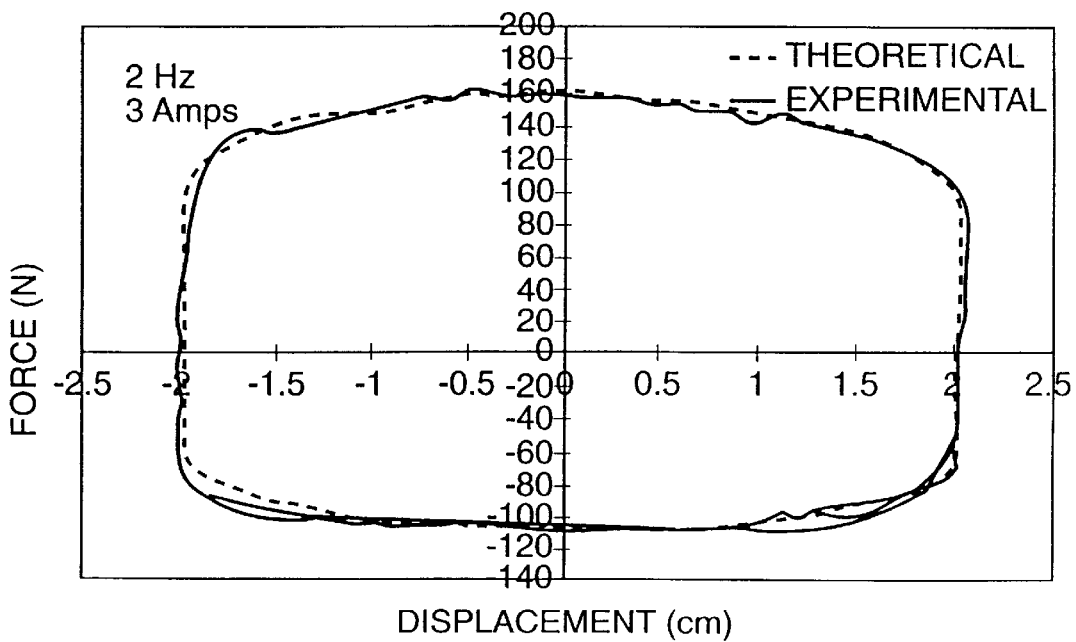
Figure 13:
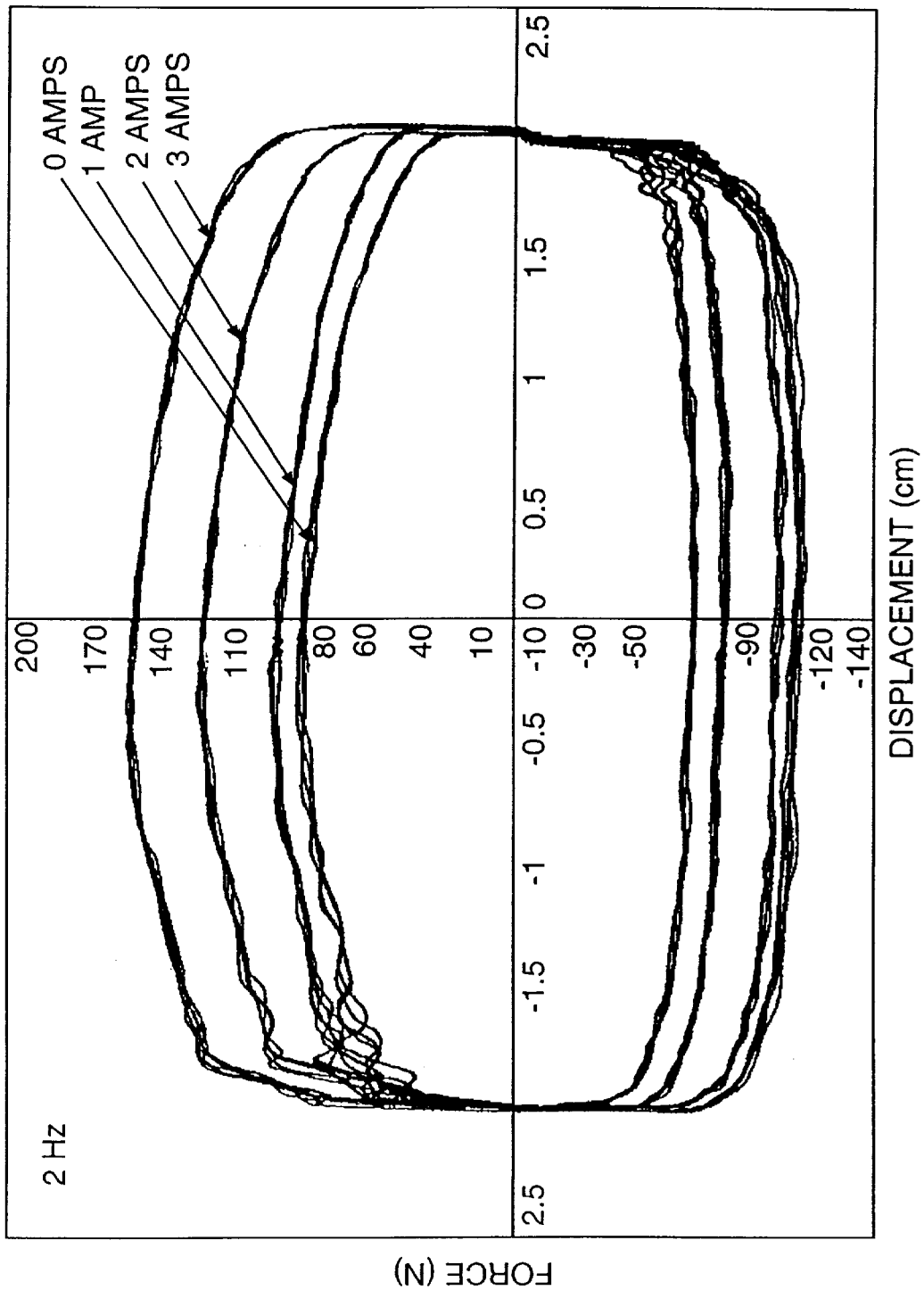

As a practical example, based on the design described above, an MRF damper was built, tested and implemented on a mountain bicycle. Force-displacement plots of a 23 cm (9 in) long mountain bicycle MRF damper with the 5 cm (2 in) diameter are presented in FIGS. 12a, 12b, and 13. As shown in FIG. 12a, a 90 N (20 lb) force was obtained at 2 Hz and amplitude of 2 cm (0.8 in) when the damper is not activated (0 Amp input). Using the Bouc-Wen model the experimental results were accurately predicted as shown. As shown in FIG. 12b, the maximum force increases to 160 N (36 lb) when the damper is activated. Compression and rebound forces vary by design depending on the application.

The structure of a third embodiment of a damper according to a third embodiment of the present invention will now be described.

Figure 14A:
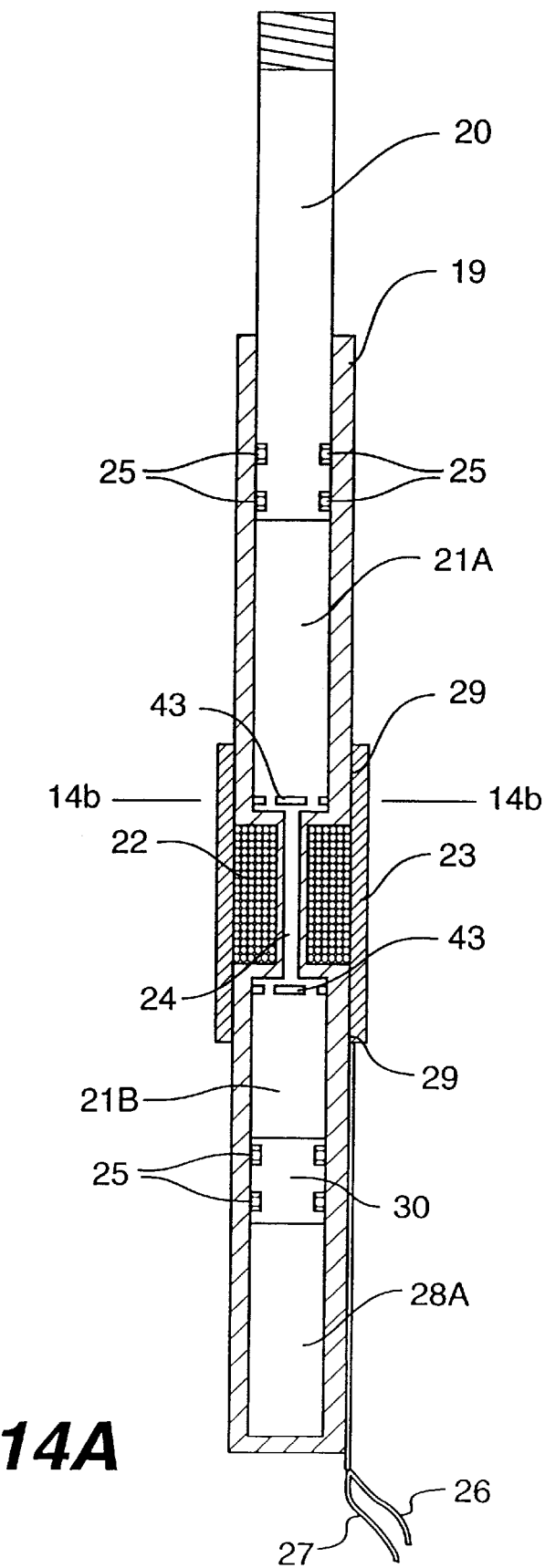
FIG. 14a is a cross-sectional view of an MRF damper according to a third embodiment of the present invention.
Figure 14B:
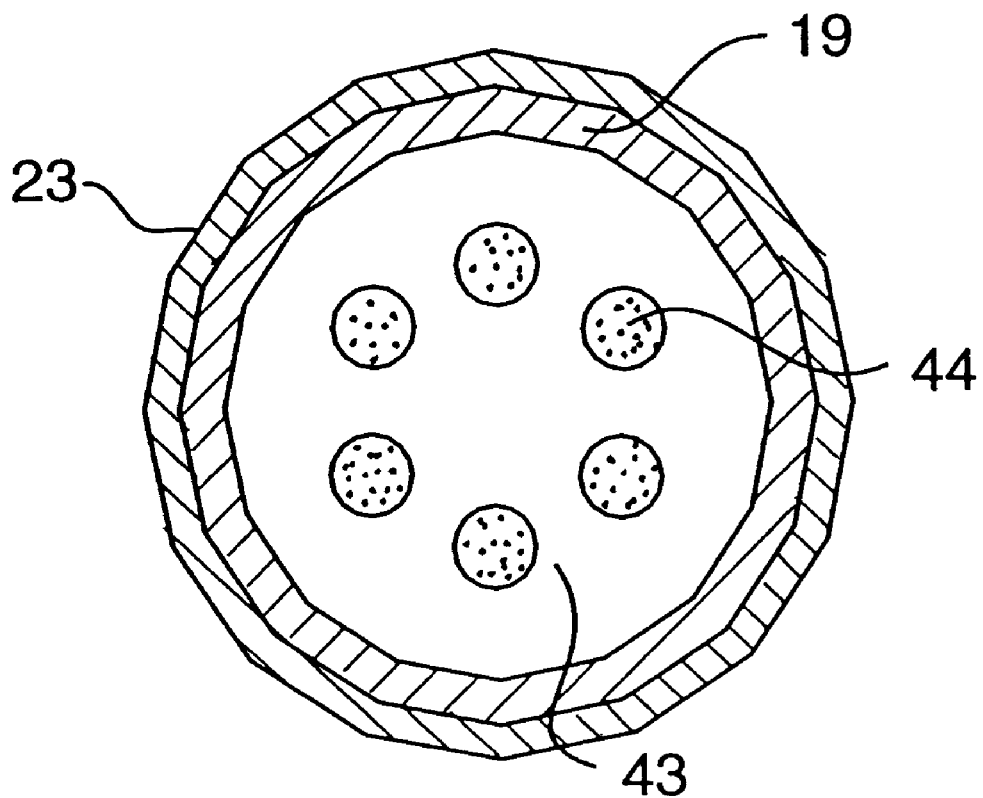
FIG. 14b is a cross-sectional view of the MRF damper of FIG. 14a along line 14b—14b.

Referring to FIGS. 14a and 14b, the housing 19 includes cavities 21A and 21B. These two cavities are connected by passage 24. Passage 24 and cavities 21A and 21B are filled with an appropriate amount of MRF. Around passage 24, the solenoid 22 is wound to create an electromagnetic field. Again, to ensure the longevity of the solenoid as well as providing additional strength and support to the housing 19 a cylindrical cover 23 is placed around electric coil 22. This can be attached to the outside of housing 19 by any appropriate means, such as welding, gluing, clamping, press fitting, or the like. The cavities 21A and 21B are fitted at each end by the pistons 20 and 30. To ensure that no fluid leaks from the device, a seal 25 of any appropriate type is provided. Wires 26 and 27 extend along the structure to enable easy access in powering the contained electromagnet. As the windings 22 are powered, an intense magnetic field is created in passage 24, thereby restricting the flow of MRF.

A second cavity 28A acts as an accumulator to compensate for the change in volume of the system as piston 20 moves within the upper housing 21. An additional floating piston 30 separates MRF 21B from the contents in cavity 28a. The contents of cavity 28a may be pressurized relative to the remaining components in order to provide a spring element to the system. FIG. 14b is a cross-section of the plate 43 with passages 44 for turning the MRF before entering cavities 21a and 21b.

Figure 15:
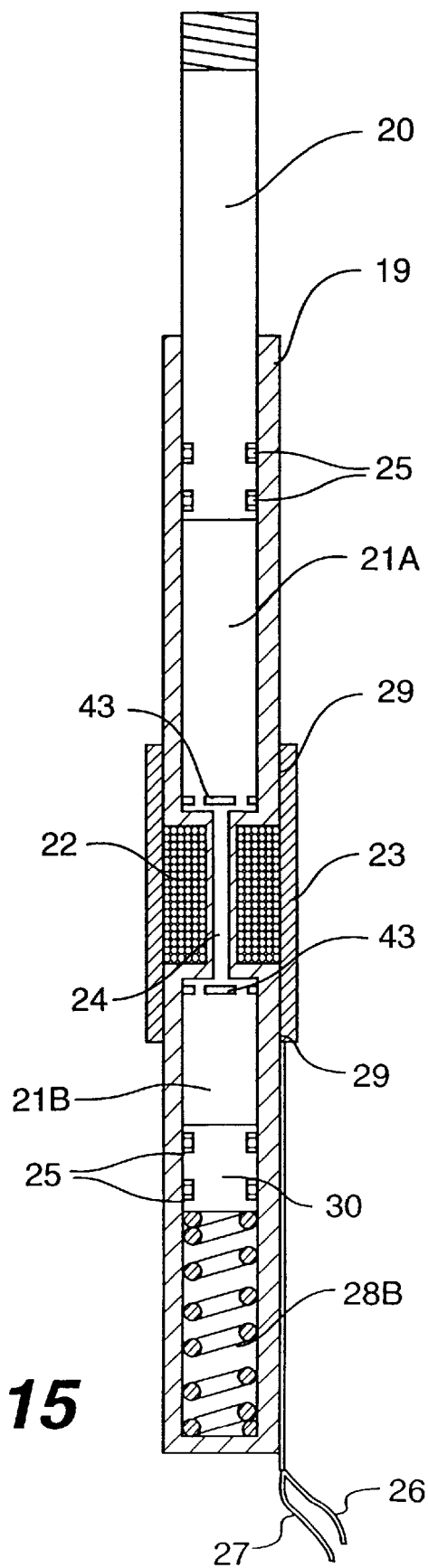
FIG. 15 is a cross-sectional view of an MRF damper according to a fourth embodiment of the present invention.

FIG. 15 shows a fourth embodiment according to the present invention. The fourth embodiment is generally similar to the third embodiment. However, a mechanical spring 28B is provided in series with the floating piston 30 instead of an enclosed cavity. The fourth embodiment also contains plates 43 as described with reference to FIGS. 14a and 14b.

The structure of a fifth embodiment of a damper according to the present invention will now be described.

Figure 16:
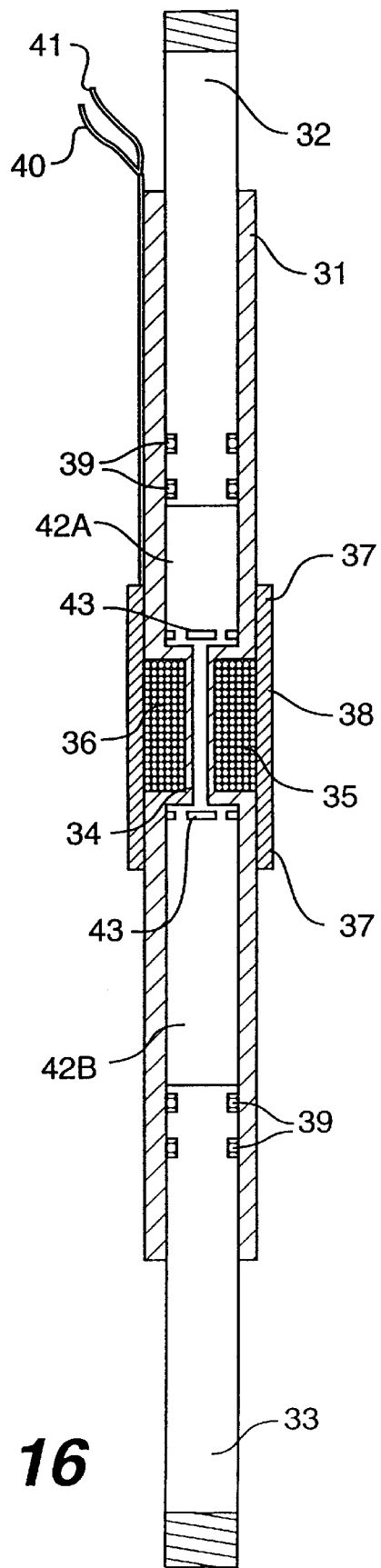
FIG. 16 is a cross-sectional view of an MRF damper according to a fifth embodiment of the present invention.

Referring to FIG. 16, housing 31 includes two cavities 42A and 42B. Cavities 42A and 42B are connected by a passage 34. The electric coil 36 is wound around passage 34. The integrity of the electric coil 36 and the strength of core 35 is maintained by encasing it with sleeve 38 which can be attached using any appropriate attachment means. Passage 34 and housing 42A and 42B are filled with an appropriate amount and type of MRF. By providing power to windings 36 through external leads 40 and 41, a magnetic field is created within passage 34, thereby restricting flow of the MRF between the two cavities 42A and 42B as described above. Cavities 42A and 42B are capped by pistons 32 and 33. The two pistons 32 and 33 will embody an appropriate seal 39 to prevent loss of fluid from the system. As piston 32 moves downward, piston 33 moves accordingly. This design eliminates the need for an external reservoir to compensate for changes in the volume of the system. The embodiment of FIG. 16 also contains plates 43 as described with reference to FIGS. 14a and 14b.

In summary, the MRF dampers of the present invention are potentially applicable to a wide variety of systems, such as bicycles, motorcycles, automobiles, trucks, ships, trains, airplanes, bridges, buildings, sports equipment or any other systems requiring vibration-shock control. Accordingly, the present invention can be adapted to achieve the desired characteristics. For example, the use of permanent magnets in place of, or in conjunction with, electromagnets. Additionally, an electromagnet may counteract the constant magnetic field of a permanent magnet to produce a reverse controlled mode. As another example, while the piston has been described with reference only to axial motion, it can be adapted to rotary motion or combinations of linear and rotary motions. The design need not be limited to only two cavities since the design may consist of a plurality of independent and/or dependent MRF cavities extending in any direction or dimension. Further, some elements may be omitted or added. For example, seals may be incorporated into piston caps or bleed screws may not be required.

Moreover, the present invention achieves variable control of the MRF flow in a passage within the MRF damper. Here, the ferrous particles of the MRF form chains parallel to the flow through the passage.

Also, non-ferrous materials may be used for the components of the MRF damper of the present invention because the magnetic flux does not need to be directed by ferrous components to reach the MRF. Instead, the MRF flows through a passage in the center of a magnet member such as a solenoid. The MRF is activated and its material properties are controlled at the end of the flow passage by variably adjusting the magnetic field generated by the magnetic circuit. Accordingly, the components may be formed of a non-ferrous material, a ferrous material or a combination of materials. Therefore, the present invention provides greater freedom in selecting materials for design requirements. For example, if the piston is made of aluminum or plastic, the total weight of the damper is significantly reduced. To ensure adequate magnetic flux in MRF, optimization of the magnetic field and the geometry of the passage is desirable.

In addition, the passages alter the flow of the MRF to increase and/or decrease the resistive force. The MRF flow passage is provided through the center of a magnet member to take advantage of the chains of ferrous particles formed along the flux lines. The chain-like formation of ferrous particles (MRF build-up) through the passage provides an effective flow diameter less than the diameter of the passage in a zero-field environment, thereby increasing the pressure drop between the two ends of the piston. Thus, the resisting (damping) force is controlled.

Further, the MRF passages may be significantly larger than those of conventional designs, thereby facilitating easy manufacturing. Therefore, the geometry of the passage may be varied to a greater extent than with conventional designs. The lower tolerances required in the manufacturing of components containing MRF flow passages are easier to manufacture, thereby reducing costly. In addition, the piston structure is simpler and more easily manufactured.

It will be apparent to those skilled in the art that various modifications and variations can be made in the MRF damper of the present invention without departing from the spirit or scope of the invention. Thus, it is intended that the present invention cover the modifications and variations of this invention provided they come within the scope of the appended claims and their equivalents.

What is claimed is:

1. A damper, comprising:

a housing;

a movable wall;

a cavity defined by the housing and the movable wall;

a passage fluidly coupled to the cavity;

a magneto-rheological fluid contained within the cavity, wherein motion of the movable wall is damped by a flow of the magneto-rheological fluid through the passage; and a magnet disposed to produce a magnetic field within the passage with field lines essentially parallel to the flow of the magneto-rheological fluid for at least one point in the passage.

2. The damper according to claim 1, wherein the movable wall forms a surface of a piston.

3. The damper according to claim 2, wherein the passage is disposed in the piston.

4. The damper according to claim 3, wherein the magnet is disposed in the piston around the passage.

5. The damper according to claim 4, wherein the magnet includes an electromagnet.

6. The damper according to claim 2, wherein the housing and the piston are formed of non-magnetic materials.

7. The damper according to claim 2, wherein the housing and the piston are formed of ferrous materials.

8. The damper according to claim 1, wherein the magnet is disposed around the passage.

9. The damper according to claim 8, wherein the magnet is disposed concentrically around the passage.

10. The damper according to claim 1, wherein the magnet includes an electromagnet.

11. The damper according to claim 1, wherein the magnet includes a permanent magnet.

12. The damper according to claim 1, wherein the magneto-rheological fluid forms chains parallel to the passage in response to the magnetic field.

13. A damper, comprising:

a housing;

a movable wall;

a cavity defined by the housing and the movable wall;

a passage fluidly coupled to the cavity;

a magneto-rheological fluid contained within the cavity; and a magnet disposed to produce a magnetic field within the passage with field lines essentially parallel to a flow of the magneto-rheological fluid for at least one point in the passage, wherein motion of the movable wall is damped by the flow of the magneto-rheological fluid through the passage, an amount of damping varying according to a magnitude of the magnetic field.

14. A damper, comprising:

a housing formed of a non-magnetic material;

a movable wall formed of a non-magnetic material;

a cavity defined by the housing and the movable wall;

a passage fluidly coupled to the cavity;

a magneto-rheological fluid contained within the cavity, wherein motion of the movable wall is damped by flow of the magneto-rheological fluid through the passage; and a magnet disposed to produce a magnetic field within the passage.

15. A damper, comprising:

a housing;

a piston slidably disposed in the housing, the piston dividing an interior of the housing into first and second cavities;

a passage defined in the piston fluidly coupling the first and second cavities;

a magneto-rheological fluid contained within the first cavity, wherein motion of the piston is damped by a flow of the magneto-rheological fluid through the passage; and a magnet disposed to produce a magnetic field within the passage with field lines essentially parallel to the flow of the magneto-rheological fluid for at least one point in the passage.

16. The damper according to claim 15, wherein the magnet includes an electromagnet.

17. The damper according to claim 15, wherein the magnet includes a permanent magnet.

18. The damper according to claim 15, wherein the magnet is arranged around the passage.

19. The damper according to claim 15, wherein the magnet is disposed in the piston.

20. The damper according to claim 15, wherein the housing includes an end cap.

21. The damper according to claim 15, further comprising a shaft connected to the piston and passing through the end cap.

22. The damper according to claim 15, further comprising at least a second passage and a one way valve, the second passage further fluidically coupling the first and second cavities when the piston moves in a first direction and covering the second passage when the piston moves in a second direction.

23. The damper according to claim 2, wherein the movable wall forms a surface of a piston, the piston being formed of non-magnetic materials.

24. The damper according to claim 23, wherein the passage is disposed in the piston.

25. The damper according to claim 24, wherein the magnet is disposed in the piston around the passage.

26. The damper according to claim 25, wherein the magnet includes an electromagnet.

27. The damper according to claim 23, wherein the housing and the piston are formed of ferrous materials.

28. The damper according to claim 23, wherein the magnet is disposed around the passage.

29. The damper according to claim 28, wherein the magnet is disposed concentrically around the passage.

30. The damper according to claim 23, wherein the magnet includes an electromagnet.

31. The damper according to claim 23, wherein the magnet includes a permanent magnet.

32. The damper according to claim 23, wherein the magneto-rheological fluid forms chains parallel to the passage in response to the magnetic field.

* * * * *